United States Patent
Yang et al.

(10) Patent No.: US 8,263,013 B2
(45) Date of Patent: Sep. 11, 2012

(54) METHOD FOR REMOVING MICRO-BUBBLES AND/OR PARTICLES FROM LIQUID, LIQUID SUPPLY APPARATUS AND IMMERSION EXPOSURE APPARATUS

(75) Inventors: Chin-Sheng Yang, Hsinchu (TW); Wen-Sheng Chien, Hsinchu (TW)

(73) Assignee: United Microelectronics Corp., Science-Based Industrial Park, Hsin-Chu (TW)

( * ) Notice: Subject to any disclaimer, the term of this patent is extended or adjusted under 35 U.S.C. 154(b) by 0 days.

(21) Appl. No.: 13/087,398

(22) Filed: Apr. 15, 2011

(65) Prior Publication Data

US 2011/0186750 A1 Aug. 4, 2011

Related U.S. Application Data

(62) Division of application No. 11/691,685, filed on Mar. 27, 2007, now Pat. No. 7,978,303.

(51) Int. Cl.
*G21K 5/00* (2006.01)
*C02F 1/30* (2006.01)

(52) U.S. Cl. ............ 422/186.3; 422/186; 210/348; 210/748.01; 210/748.06; 250/432 R

(58) Field of Classification Search .......... 210/243, 210/459, 748.01–748.1; 250/251, 435, 432 R; 435/173.1, 173.9; 422/20, 21, 22, 23, 24, 422/121, 162, 186.1, 186, 186.3
See application file for complete search history.

(56) References Cited

U.S. PATENT DOCUMENTS

| 4,376,637 A * | 3/1983 | Yang ............................. 95/74 |
| 6,815,664 B2 * | 11/2004 | Wang et al. .................. 250/251 |
| 6,867,844 B2 | 3/2005 | Vogel |
| 2008/0067335 A1 | 3/2008 | Hou |

FOREIGN PATENT DOCUMENTS

| CN | 1573571 A | 2/2005 |
| TW | 200502719 | 1/2005 |

* cited by examiner

*Primary Examiner* — Joseph Drodge
*Assistant Examiner* — Cameron J Allen
(74) *Attorney, Agent, or Firm* — Winston Hsu; Scott Margo

(57) ABSTRACT

A liquid supply apparatus capable of removing micro-bubbles and particles is described, including a pipe, a laser provider and at least one micro-bubble/particle outlet. The laser provider provides a laser crossing the pipe, wherein the laser is provided in a manner such that a micro-bubble/particle blocking/repelling barrier is formed crossing the pipe blocking or repelling micro-bubbles, particles or both in the liquid in the pipe. The micro-bubble/particle outlet is disposed on the pipe between the barrier and the liquid inlet of the pipe, adjacent to the barrier for discharging micro-bubbles, particles or both.

12 Claims, 5 Drawing Sheets

METHOD FOR REMOVING MICRO-BUBBLES AND/OR PARTICLES FROM LIQUID, LIQUID SUPPLY APPARATUS AND IMMERSION EXPOSURE APPARATUS

CROSS REFERENCE TO RELATED APPLICATIONS

This application is a division of U.S. application Ser. No. 11/691,685, filed Mar. 27, 2007, and incorporated herein by reference in its entirety.

BACKGROUND OF THE INVENTION

1. Field of the Invention

This invention relates to a method for removing micro-bubble and/or particles from a liquid and a liquid supply apparatus utilizing the method, and more particularly to a method of utilizing laser to remove micro-bubble and/or particles from a liquid, a liquid supply apparatus utilizing the method, and an immersion exposure apparatus that incorporates the liquid supply apparatus.

2. Description of the Prior Art

Liquid is used in many industries as a medium for reaction or measurement, etc. However, micro-bubbles and/or particles in a liquid frequently cause problems.

Taking the semiconductor industry as an example, a liquid like water is used in the immersion lithography that is recently developed for the following reasons. As the linewidth of semiconductor process is to be reduced, the most direct way is to reduce the wavelength of the exposure light and thereby enhance the resolution. However, there are so many issues to be solved, such as the laser source, photomask material, lens material and photoresist material, for the new-generation lithography process of 157 nm. For example, it is difficult to fabricate lenses of calcium fluoride suitable for 157 nm exposure, for the lenses either have many defects or cause significant aberrations and thus cannot project a clear image on the wafer. Hence, the immersion lithography is developed, which allows the resolution to be enhanced based on current 193 nm lithography instead of the development of 157 nm lithography. The immersion lithography method is to inject water between the light source and the wafer in a 193 nm exposure system to reduce the wavelength to 132 nm, so that 65 nm, 45 nm and even 32 nm processes can be supported by the immersion lithography instead of current dry lithography systems.

However, there are still some technical problems in immersion lithography. For example, the exposure light may be scattered by the micro-bubbles or particles in the water in the immersion exposure system so that many defects are incurred in the image transferred to the wafer.

SUMMARY OF THE INVENTION

Accordingly, this invention provides a method for removing micro-bubbles and/or particles from a liquid, which can easily remove micro-bubbles and/or particles.

This invention also provides a liquid supply apparatus that utilizes the above method of this invention to remove micro-bubbles and/or particles from a liquid.

This invention also provides a immersion exposure apparatus that incorporates the liquid supply apparatus of this invention.

It is particularly noted that in the specification and claims of this invention, the term "micro-bubble(s)/particle(s)" means micro-bubble(s), particle(s) or both of them, and the term "blocking/repelling" means blocking, repelling or both of them.

The liquid supply apparatus of this invention includes a pipe with a liquid inlet and a liquid outlet, a laser provider for providing laser crossing the pipe, and at least one micro-bubble/particle outlet. The laser is provided in a manner such that a micro-bubble/particle blocking/repelling barrier is formed capable of blocking/repelling micro-bubbles/particles in the liquid in the pipe. The micro-bubble/particle outlet is disposed on the pipe between the barrier and the liquid inlet, adjacent to the micro-bubble/particle blocking/repelling barrier for discharging micro-bubbles/particles.

The method for removing micro-bubbles and/or particles from a liquid of this invention is described as follows. A pipe having a micro-bubble/particle outlet thereon is provided. The liquid is then conducted through the pipe while a laser is provided crossing the pipe in a manner such that a micro-bubble/particle blocking/repelling barrier is formed in the pipe for blocking/repelling micro-bubbles/particles in the liquid. The micro-bubble/particle outlet is located on the pipe between the barrier and the liquid inlet, adjacent to the barrier for discharging micro-bubbles/particles.

The immersion exposure apparatus of this invention includes a wafer-scanning stage, an exposure optical system, an immersion chamber and a liquid supply apparatus of this invention. The wafer-scanning stage is for supporting a wafer with photoresist thereon or a cleaning wafer. The exposure optical system is disposed above the wafer-scanning stage. The immersion chamber is disposed between the wafer-scanning stage and the exposure optical system, for accommodating an exposure medium in exposure or a solvent in a cleaning operation. The liquid supply apparatus is for supplying the exposure medium or the solvent, including a reservoir for storing the exposure medium or the solvent, a supply pipe, a laser provider and at least a micro-bubble/particle outlet. The supply pipe includes a liquid inlet connected with the reservoir and a liquid outlet connected with the immersion chamber. The descriptions of the laser provider and the at least one micro-bubble/particle outlet are the same as the above mentioned.

In some embodiments of this invention, a cross section of the pipe has a circular shape or a rectangular shape.

In some embodiments, the micro-bubble/particle blocking/repelling barrier is a substantially planar barrier. The planar barrier may be substantially parallel with a cross-sectional plane of the pipe or be inclined in the flow direction of the liquid in the pipe. Alternatively, the planar barrier is substantially perpendicular to the sidewalls of the pipe or is inclined to the sidewalls. When the planar barrier forms a sharp angle with a sidewall of the pipe as viewed from the upstream of the barrier, the micro-bubble/article outlet is preferably disposed on the sidewall or the top wall of the pipe adjacent to the sharp angle, wherein the "upstream" of the barrier is defined by the flow direction of the liquid in the pipe.

In some embodiments, the micro-bubble/particle blocking/repelling barrier is a sectional barrier, which may include two or more planar parts. When at least one planar part of the sectional barrier forms a sharp angle with a sidewall of the pipe as viewed from the upstream of the barrier, the micro-bubble/particle outlet is preferably disposed on the sidewall or the top wall of the pipe adjacent to the sharp angle. When at least one planar part of the sectional barrier forms an obtuse angle with a sidewall of the pipe as viewed from the upstream of the barrier, the micro-bubble/particle outlet is preferably disposed on the top wall of the pipe adjacent to the intersection of two adjacent planar parts.

In certain embodiments, the micro-bubble/particle outlet is disposed on the top wall or a sidewall of the pipe. The blocking/repelling barrier may extend through at least a part of the micro-bubble/particle outlet. The light intensity in the blocking/repelling barrier may have a substantially gradient distribution. The liquid outlet may be connected with a liquid inlet of an immersion exposure system.

Because this invention utilizes laser to form a micro-bubble/particle blocking/repelling barrier in the flow path of the liquid, the micro-bubbles and/or particles in the liquid can be removed easily.

In order to make the aforementioned and other objects, features and advantages of the present invention comprehensible, a preferred embodiment accompanied with figures is described in detail below.

These and other objectives of the present invention will no doubt become obvious to those of ordinary skill in the art after reading the following detailed description of the preferred embodiment that is illustrated in the various figures and drawings.

DETAILED DESCRIPTION

Some embodiments are provided below to further explain this invention, which are not intended to limit the scope of this invention. It is also noted that a method of forming a barrier (force field) capable of blocking/repelling micrometer bubble/particle with laser can be derived based on the descriptions of U.S. Pat. No. 6,815,664, which is intended to sort micrometer particles in a liquid.

Figure 1A:
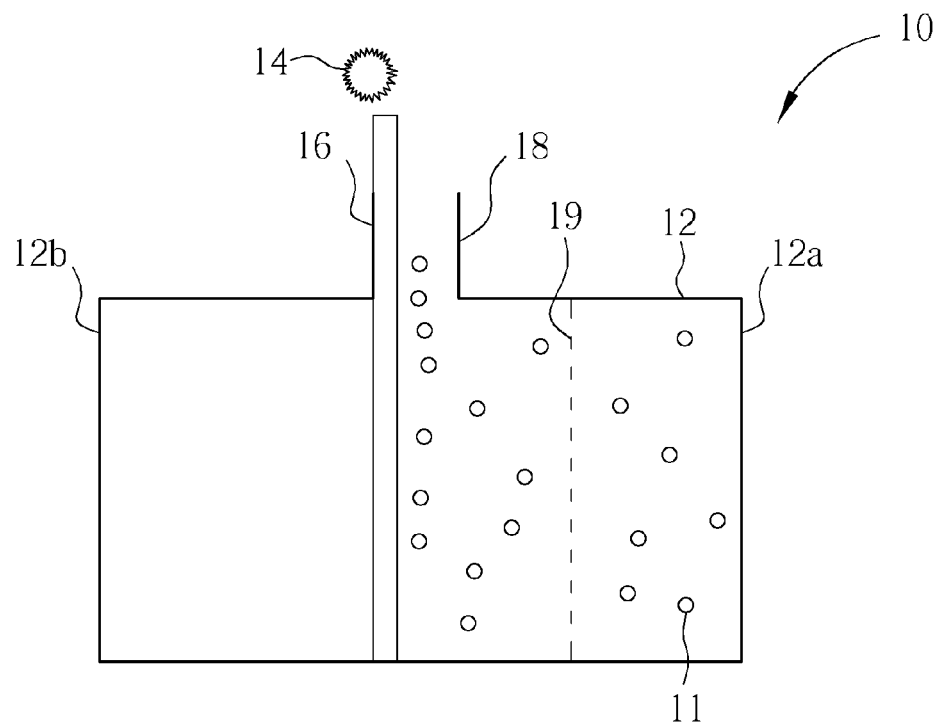
FIGS. 1A and 1B schematically illustrate two embodiments of the liquid supply apparatus of this invention, wherein the micro-bubble/particle blocking/repelling barrier is substantially planar and substantially parallel with a cross-sectional plane of the pipe.

Referring to FIG. 1A, in this embodiment, a liquid supply apparatus 10 capable of removing micro-bubbles and particles includes a pipe 12 and a laser provider 14. A cross section of the pipe 12 may have a circular shape or a rectangular shape, and the material of the same may be plastic like PVC, quartz or glass, etc. The laser provider 14 provides laser crossing the pipe 12, wherein the laser is provided in a manner such that a micro-bubble/particle blocking/repelling barrier 16 is formed. When water, an organic solvent or a mixed liquid from the liquid inlet 12a of the pipe 12 flows through the barrier 16, micro-bubbles/particles 11 are blocked and/or repelled by the barrier 16 to accumulate before the barrier 16, so that the liquid passing the barrier 16 contains few or even no micro-bubbles or particles. The liquid supply apparatus 10 further includes at least one micro-bubble/particle outlet 18 disposed on the pipe 12 between the barrier 16 and the liquid inlet 12a adjacent to the barrier 16. With the aid of the liquid flow, the micro-bubbles/particles 11 accumulated before the barrier 16 are discharged from the micro-bubble/particle outlet 18.

The shape and location of the micro-bubble/particle blocking/repelling barrier 16 as well as the location and number of the micro-bubble/particle outlet 18 can be varied as required. Some variations are described as follows, which are not intended to limit the scope of this invention.

Figure 1B:
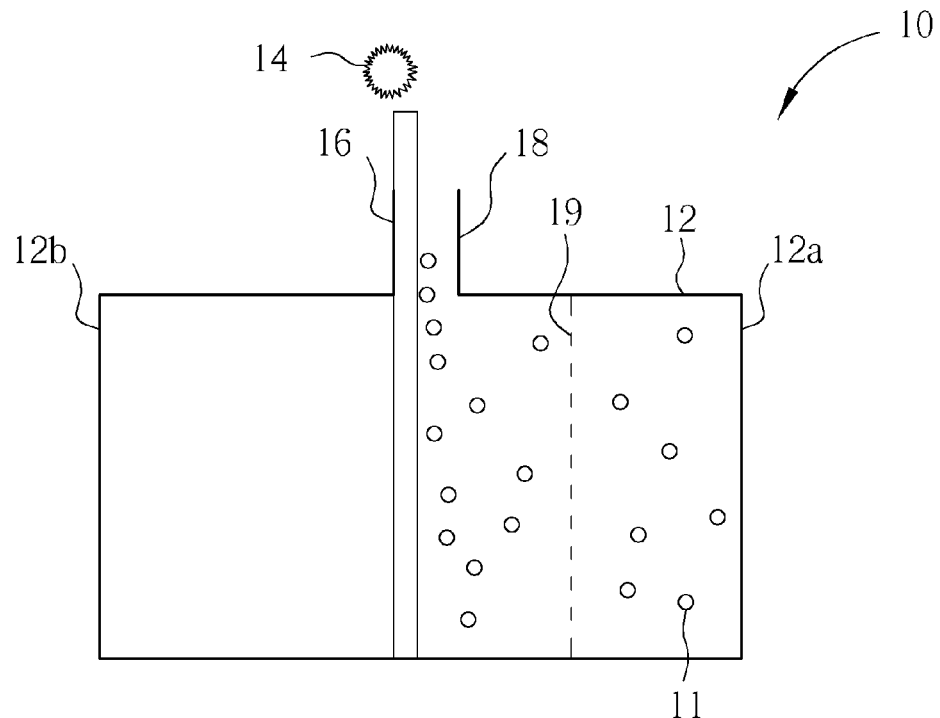

Referring to FIGS. 1A and 1B, in these embodiments, the micro-bubble/particle blocking/repelling barrier 16 formed with the laser provider 14 is substantially parallel with a cross-sectional plane 19 of the pipe 12. The barrier 16 may be formed at the downstream side of the micro-bubble/particle outlet 18 adjacent to the same, as shown in FIG. 1A. Alternatively, the barrier 16 may extend through a part of the micro-bubble/particle outlet 28, as shown in FIG. 1B.

Figure 2A:
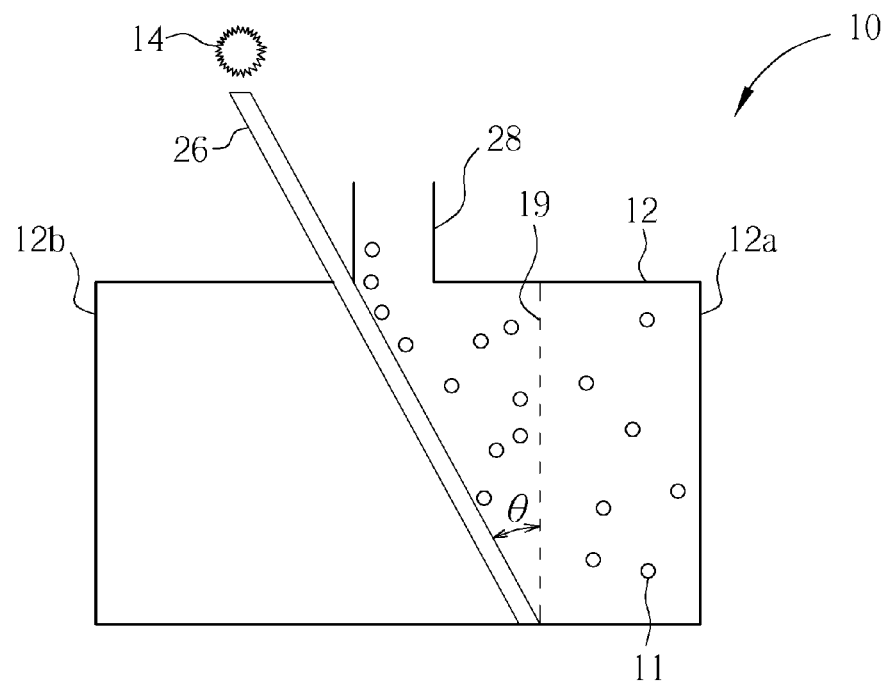
FIGS. 2A and 2B schematically illustrate two more embodiments of the liquid supply apparatus of this invention, wherein the micro-bubble/particle blocking/repelling barrier is inclined to the flow direction of the liquid in the pipe.
Figure 2B:
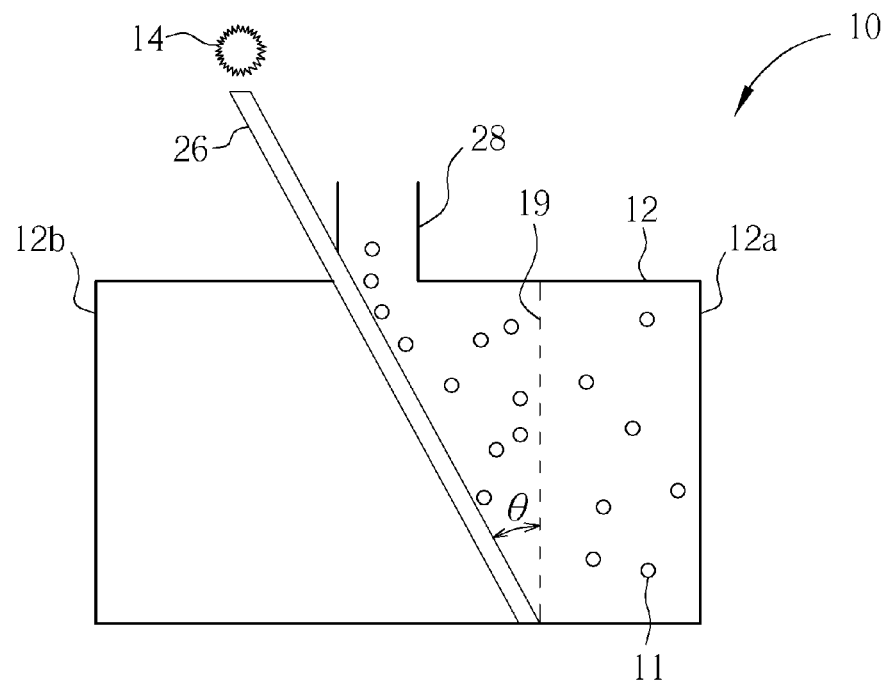

Referring to FIGS. 2A and 2B, in these two embodiments, the laser provider 14 provide a laser in a manner such that the blocking/repelling barrier 26 formed is inclined in the flow direction of the liquid from the inlet 12a to the outlet 12b of the pipe 12 and forms a sharp angle θ with a cross-sectional plane 19 of the pipe 12. Similarly, the barrier 26 may be formed with its top part at the downstream side of the micro-bubble/particle outlet 18, as shown in FIG. 2A, or formed through a part of the micro-bubble/particle outlet 28, as shown in FIG. 2B. In fact, the location of the micro-bubble/particle outlet 18 or 28 is not particularly limited, if only the micro-bubbles/particles can be discharged easily.

Figure 3A:
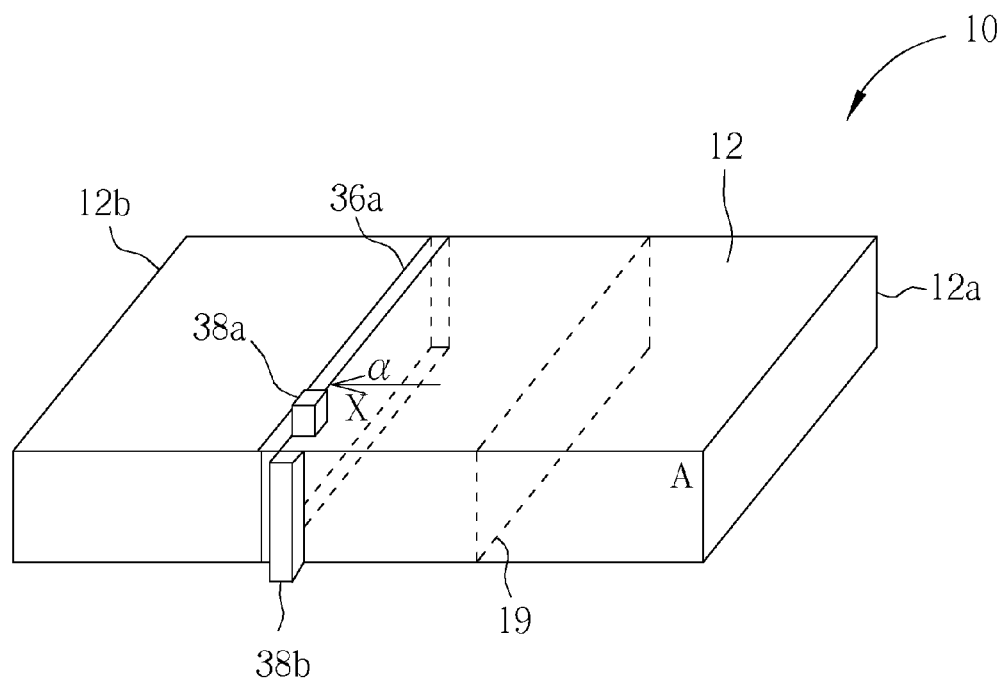
FIGS. 3A and 3B schematically illustrate two more embodiments of the liquid supply apparatus of this invention, wherein the micro-bubble/particle blocking/repelling barrier is substantially planar and substantially perpendicular to the top wall of the pipe.
Figure 3B:
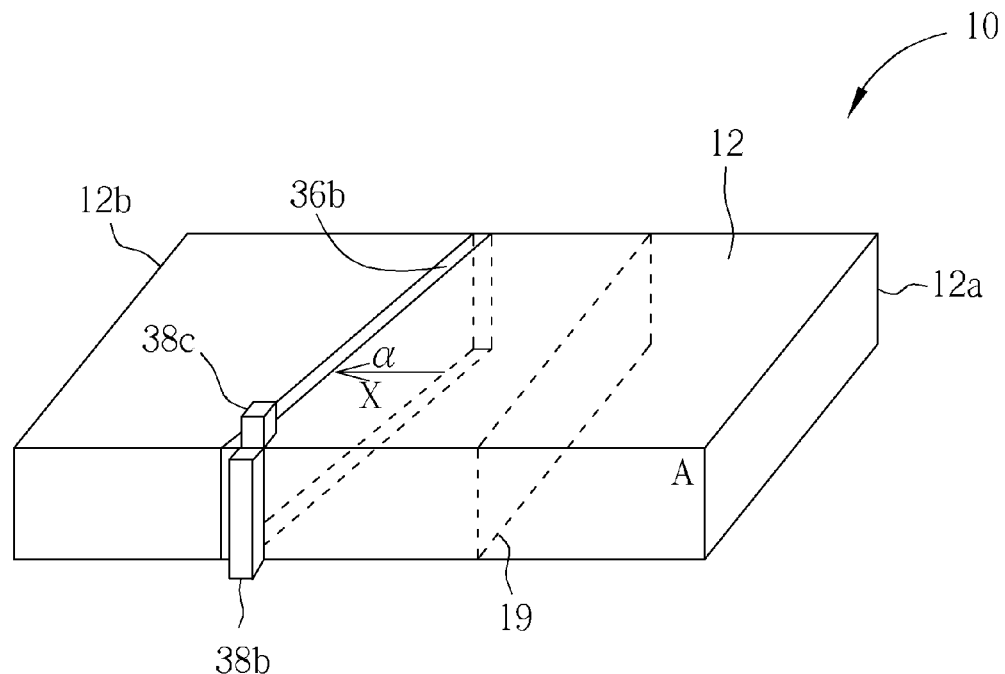
Figure 4A:
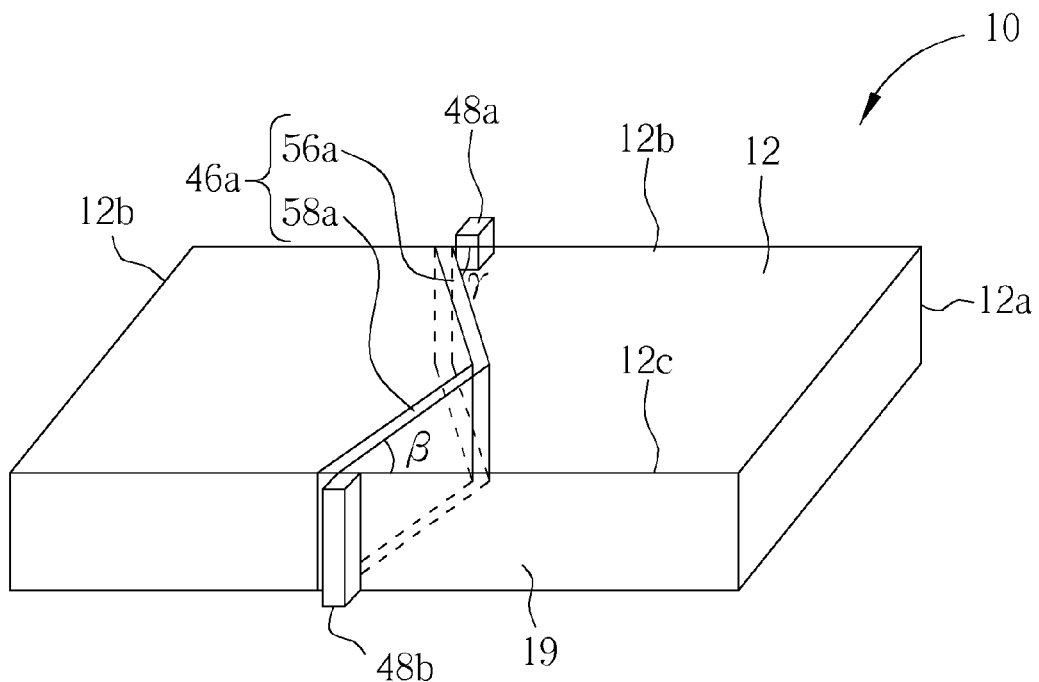
FIGS. 4A-4C schematically illustrate three more embodiments of the liquid supply apparatus of this invention, wherein the micro-bubble/particle blocking/repelling barrier is a sectional barrier including two or more substantially planar parts.
Figure 4B:
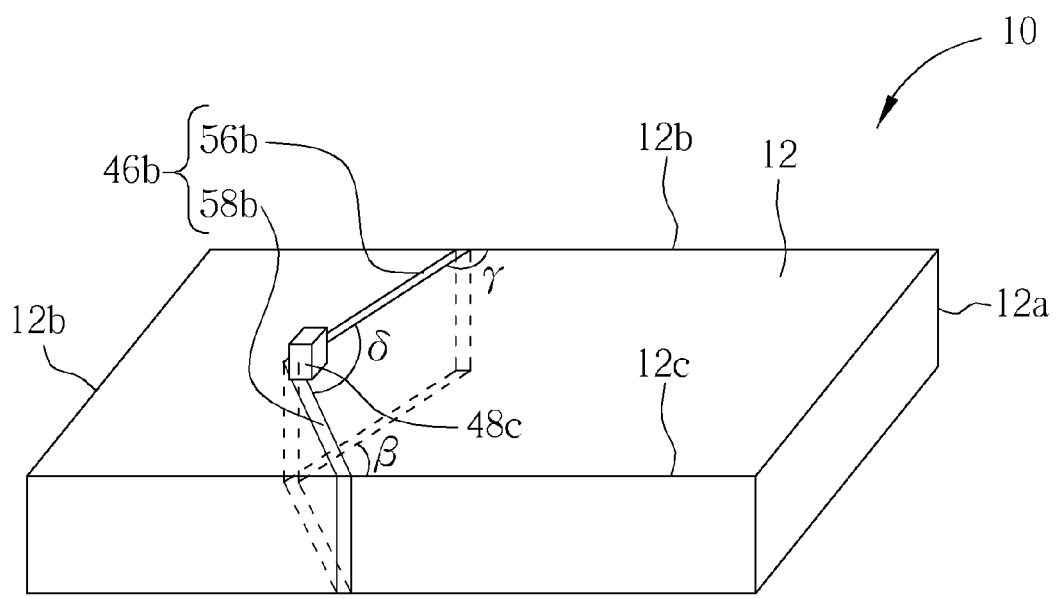
Figure 4C:
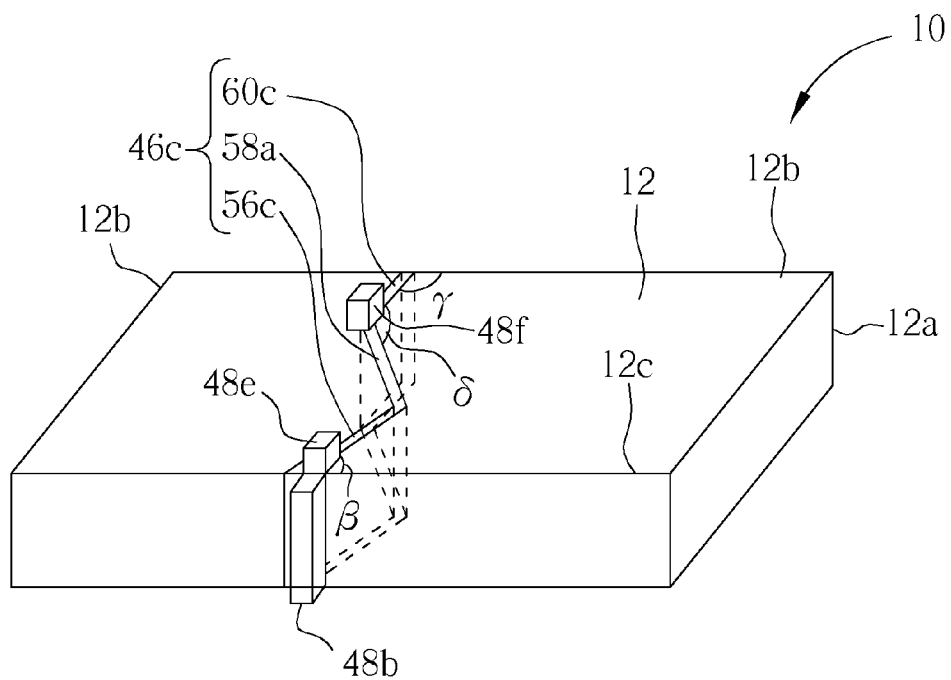

In an embodiment, the micro-bubble/particle blocking/repelling barrier formed with the laser provider 14 may be a substantially planar one, as shown in FIGS. 3A-3B. In another embodiment, the barrier is formed as a sectional one, which may include two or more substantially planar parts as shown in FIGS. 4A-4C. The pipe 12 in each of FIGS. 3A-3B and 4A-4C has a rectangular cross section for simplifying the following descriptions, but the shape of the pipe applicable to this invention is not limited to that.

Referring to FIGS. 3A-3B, the micro-bubble/particle blocking/repelling barriers 36a and 36b formed by the laser provider 14 are substantially planar ones. In FIG. 3A, the barrier 36a is substantially perpendicular to the extending direction x of the pipe 12, which is the flow direction of the liquid in the pipe 12 in this case. In FIG. 3B, the barrier 36b is inclined to the sidewalls of the pipe 12 and forms a sharp angle α with the extending direction x of the pipe 12. The intersection of the barrier 36a or 36b and a sidewall of the pipe 12 is substantially parallel with that of a cross-sectional plane 19 and the sidewall in these two embodiments, but the two intersections may alternatively not be parallel with each other in other embodiments.

Referring to FIG. 3A, when the barrier 36a is a planar one that is substantially perpendicular to the extending direction x of the pipe 12, a micro-bubble/particle outlet 38a can be disposed at any location above the pipe 12 adjacent to the barrier 36a. An extra micro-bubble/particle outlet 38b may be disposed on a sidewall of the pipe 12 adjacent to the barrier 36a.

Referring to FIG. 3B, when the barrier 36b is a planar barrier that forms a non-right angle α with the extending direction x of the pipe 12 and thus forms a sharp angle and a obtuse angle with respective sidewalls of the pipe 12 as viewed from the upstream of the barrier 36b defined by the flow direction of the liquid from 12a to 12b, it is preferred to dispose a micro-bubble/particle outlet 38c above the pipe 12 adjacent to the sharp angle and/or a micro-bubble/particle outlet 38d on a sidewall of the pipe 12 adjacent to the sharp angle.

Referring to FIGS. 4A-4C, the micro-bubble/particle blocking/repelling barriers formed with the laser provider are sectional ones, which may, but are not limited to, include two or more substantially planar parts. The sectional barrier 46a in FIG. 4A has two planar parts 58a and 56a that form two sharp angles β and γ respectively with the sidewalls 12c and 12d of the pipe 12 as viewed from the upstream of the barrier 46a. The sectional barrier 46b in FIG. 4B has two planar parts 58b and 56b that form two obtuse angles β and γ respectively with the sidewalls 12c and 12d of the pipe 12 as viewed from the upstream of the barrier 46b. The sectional barrier 46c in FIG. 4C has three planar parts 56c, 58c and 60c, wherein the planar part 56c forms a sharp angle β with the sidewall 12c and the planar part 60c forms an obtuse angle γ with the sidewall 12d as viewed from the upstream of the barrier 46c.

Referring to FIG. 4A, when the sectional barrier 46a has two planar parts 58a and 56a that form two sharp angles β and γ respectively with the sidewalls 12c and 12d of the pipe 12 as viewed from the upstream of the barrier 46a, it is preferred to dispose one or more micro-bubble/particle outlets at one or more locations among the locations on the two sidewalls 12c and 12d and on the top wall of the pipe 12 that are adjacent to the sharp angles β and γ. The liquid supply apparatus in FIG. 4A merely has a micro-bubble/particle outlet 48a disposed above the pipe 12 adjacent to the sharp angle γ and a micro-bubble/particle outlet 48b disposed on the sidewall 12c adjacent to the sharp angle β.

Referring to FIG. 4B, when the sectional barrier 46b has two planar parts 58b and 56b that form two obtuse angles β and γ respectively with the sidewalls 12c and 12d as viewed from the upstream of the barrier 46b, a micro-bubble/particle outlet 48c is preferably disposed above the pipe 12 adjacent to the intersection of the two planar parts 56b and 58b that form an angle δ between them.

Referring to FIG. 4C, when the sectional barrier 46c has three planar parts 56c, 58c and 60c wherein the planar parts 56c and 60c respectively form a sharp angle β and an obtuse angle γ with the sidewall 12c and 12d as viewed from the upstream of the barrier 46c, three micro-bubble/particle outlets 48d, 48e and 48f may be disposed respectively above the pipe 12 adjacent to the sharp angle β, on the sidewall 12c adjacent to the sharp angle β, and above the pipe 12 adjacent to the intersection of the two planar parts 58c and 60c that form an angle δ smaller than 180° as viewed from the upstream of the barrier 46c. It is also feasible to disposed one or two micro-bubble/particle outlets at one or two of the above three locations. In principle, a micro-bubble/particle outlet is disposed at a location where micro-bubbles/particles easily accumulate, i.e., a part of the sidewall of the pipe at the downstream side of the barrier and directly adjacent to the barrier.

The sectional micro-bubble/particle blocking/repelling barriers 46a-46c in the embodiments illustrated in FIGS. 4A-4C each has an overall extending direction that is substantially parallel with the cross-sectional plane 19. Nevertheless, the overall extending direction of a sectional micro-bubble/particle blocking/repelling barrier in this invention is not limited to be parallel with a cross-sectional plane of the pipe and may be unparallel with the latter.

Besides, the light intensity in an aforementioned micro-bubble/particle blocking/repelling barrier of this invention may have a substantially uniform distribution or have a substantially gradient distribution. The micro-bubble/particle blocking/repelling barrier may alternatively be formed in a multi-points or multi-lines arrangement caused by light spots and light planes to enhance the removal efficiency of the micro-bubbles/particles.

Figure 5:
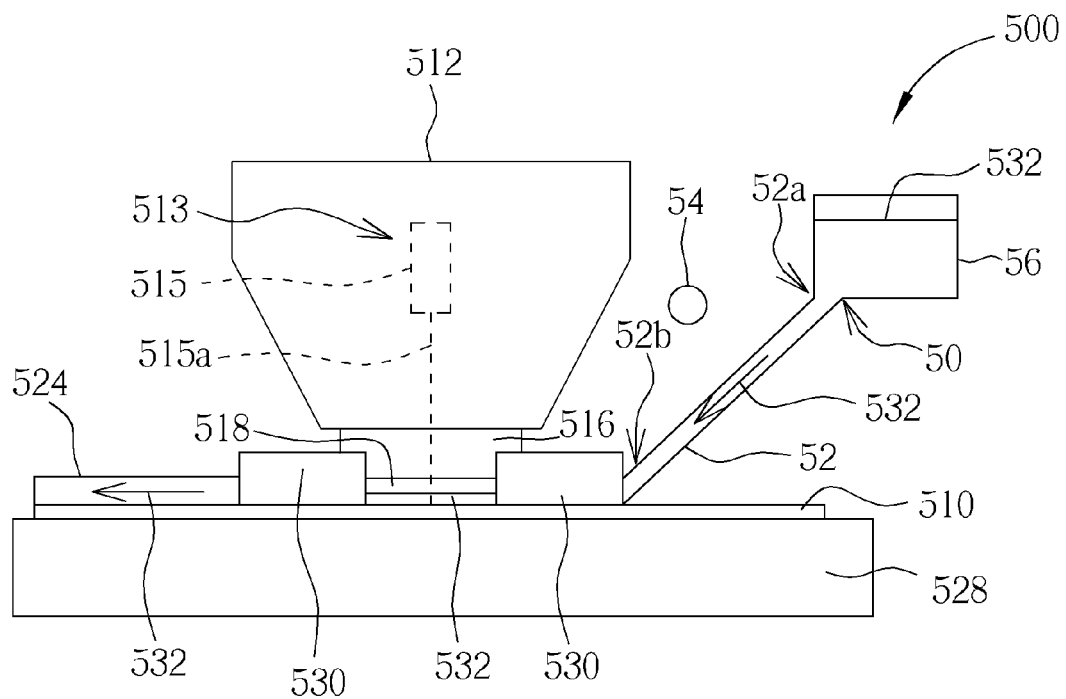
FIG. 5 schematically illustrates an immersion exposure apparatus according to an embodiment of this invention into which a liquid supply apparatus of this invention is incorporated for supplying a liquid to be used in the immersion exposure apparatus.

Referring to FIG. 5, the method for removing micro-bubbles/particles and the liquid supply apparatus of this invention can be applied to immersion lithography for providing a liquid with few or even no micro-bubbles and/or particles. An example of an exposure apparatus of an immersion lithograph system that utilizes the liquid supply method and apparatus of this invention is illustrated in FIG. 5.

Referring to FIG. 5, the exposure apparatus 500 of an immersion lithograph system includes a wafer-scanning stage 528 for supporting a wafer having a photoresist layer thereon or a cleaning wafer 510. The optical housing 512 includes an optical system 513 for accommodating a mask (not shown). The optical system 513 includes a light source 515, such as a laser, and an objective lens 516 configured correspondingly above the wafer-scanning stage 528. The immersion chamber 518, configured below the objective lens 516 but above the scanning stage 528, is used for accommodating a liquid 532, for example, an exposure medium like water, or a solvent for cleaning the objective lens 516, such as water.

The immersion chamber 518 can be an air-tight chamber formed by supplying an inert gas through a gas inlet duct (not shown). The liquid in the immersion chamber 518 is supplied by a liquid supply apparatus 50 of this invention. The liquid supply apparatus 50 includes a supply pipe 52 having a liquid inlet 52a and a liquid outlet 52b and a laser provider 54 for forming a micro-bubble/particle blocking/repelling barrier (not shown), as mentioned above, and further includes a reservoir 56. The reservoir 56 is for storing the liquid 532, the liquid inlet 52a of the supply pipe 52 is connected with the reservoir 56, and the liquid outlet 52b is connected with the immersion chamber 518. After being used, the liquid 532 in the immersion chamber 518 can be discharged via a discharge pipe 524.

In the lithograph process, a light beam 515a, such as a laser beam, is transmitted through the objective lens 516 and the liquid medium in the immersion chamber 518 onto the photoresist, and the image of the mask is transferred to the photoresist on the wafer.

Subsequent to the exposure process, a cleaning operation may be performed by supplying a solvent from the liquid supply apparatus 50 to the immersion chamber 518 to remove the contaminants on the objective lens 516. To improve the cleaning effect, the exposure apparatus 500 may further includes an ultrasonic vibrator for vibrating the cleaning solvent, such as an ultrasonic vibrator 530 set around the immersion chamber 518.

Nevertheless, the above method and apparatus of this invention are not limited to apply to the immersion lithography, but can also be applied to any other industry that needs removal of micro-bubbles and/or particles.

The present invention has been disclosed above in the preferred embodiments, but is not limited to those. It is known to persons skilled in the art that some modifications and innovations may be made without departing from the spirit and scope of the present invention. Therefore, the scope of the present invention should be defined by the following claims.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A liquid supply apparatus that can remove micro-bubbles and particles from a liquid, comprising:
    a pipe including a liquid inlet and a liquid outlet;
    a laser provider for providing a laser light layer crossing the pipe, the laser light layer is provided in a manner such that the laser light layer serves as a micro-bubble/particle blocking/repelling barrier for blocking or repelling micro-bubbles, particles or both from the liquid in the pipe to allow the micro-bubbles, particles or both to accumulate in front of or on the micro-bubble/particle blocking/repelling barrier; and
    at least one micro-bubble/particle outlet on the pipe between the micro-bubble/particle blocking/repelling barrier and the liquid inlet, adjacent to the micro-bubble/particle blocking/repelling barrier for discharging the micro-bubbles, particles or both.

2. The liquid supply apparatus of claim 1, wherein a cross section of the pipe has a circular shape or a rectangular shape.

3. The liquid supply apparatus of claim 1, wherein the micro-bubble/particle blocking/repelling barrier is a planar barrier.

4. The liquid supply apparatus of claim 3, wherein the planar barrier is substantially parallel with a cross-sectional plane of the pipe or is inclined to a flow direction of the liquid in the pipe.

5. The liquid supply apparatus of claim 3, wherein the planar barrier is substantially perpendicular to sidewalls of the pipe or is inclined to the sidewalls of the pipe.

6. The liquid supply apparatus of claim 5, wherein the planar barrier forms a sharp angle with a sidewall of the pipe as viewed from upstream of the planar barrier, and the micro-bubble/particle outlet is disposed on the sidewall or a top wall of the pipe adjacent to the sharp angle, wherein the upstream of the planar barrier is defined by a flow direction of the liquid in the pipe.

7. The liquid supply apparatus of claim 1, wherein the micro-bubble/particle blocking/repelling barrier is a sectional barrier including a plurality of planar parts.

8. The liquid supply apparatus of claim 7, wherein
    when at least one planar part of the sectional barrier forms a sharp angle with a sidewall of the pipe as viewed from upstream of the sectional barrier, the micro-bubble/particle outlet is disposed on the sidewall or a top wall of the pipe adjacent to the sharp angle, wherein the upstream of the sectional barrier is defined by a flow direction of the liquid in the pipe; and
    when at least one planar part of the sectional barrier forms an obtuse angle with a sidewall of the pipe as viewed from the upstream of the sectional barrier, the micro-bubble/particle outlet is disposed on a top wall of the pipe adjacent to an intersection of two adjacent planar parts.

9. The liquid supply apparatus of claim 1, wherein the micro-bubble/particle outlet is disposed on a top wall or a sidewall of the pipe.

10. The liquid supply apparatus of claim 1, wherein the micro-bubble/particle blocking/repelling barrier extends through at least a part of the micro-bubble/particle outlet.

11. The liquid supply apparatus of claim 1, wherein light intensity in the micro-bubble/particle blocking/repelling barrier has a substantially gradient distribution.

12. The liquid supply apparatus of claim 1, wherein the liquid outlet is connected with a liquid inlet of an immersion exposure system.

* * * * *